United States Patent
Takeuchi

(10) Patent No.: US 12,445,919 B2
(45) Date of Patent: Oct. 14, 2025

(54) WIRELESS COMMUNICATION DEVICE, WIRELESS COMMUNICATION SYSTEM, WIRELESS COMMUNICATION CONNECTION METHOD, AND PROGRAM

(71) Applicant: MITSUBISHI HEAVY INDUSTRIES, LTD., Tokyo (JP)

(72) Inventor: Koji Takeuchi, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 389 days.

(21) Appl. No.: 18/163,002

(22) Filed: Feb. 1, 2023

(65) Prior Publication Data

US 2023/0292196 A1    Sep. 14, 2023

(30) Foreign Application Priority Data

Mar. 8, 2022    (JP) .................................. 2022-035421

(51) Int. Cl.
*H04W 36/00*  (2009.01)
*H04W 36/30*  (2009.01)

(52) U.S. Cl.
CPC . *H04W 36/00837* (2018.08); *H04W 36/0058* (2018.08); *H04W 36/008375* (2023.05); *H04W 36/30* (2013.01)

(58) Field of Classification Search
None
See application file for complete search history.

(56) References Cited

U.S. PATENT DOCUMENTS

| | | | |
|---|---|---|---|
| 2007/0270149 A1* | 11/2007 | Yanagihara ......... | H04W 36/302 455/436 |
| 2009/0203378 A1* | 8/2009 | Negishi ............... | H04W 36/324 455/436 |
| 2015/0131616 A1* | 5/2015 | Jo .................. | H04W 36/008357 370/331 |
| 2016/0353320 A1* | 12/2016 | Hongo ................. | H04W 4/027 |
| 2018/0234901 A1* | 8/2018 | Suh ...................... | H04W 36/08 |
| 2022/0069902 A1* | 3/2022 | Fan ...................... | H04W 36/38 |

FOREIGN PATENT DOCUMENTS

JP    4880546 B2    2/2012

* cited by examiner

*Primary Examiner* — Kodzovi Acolatse
(74) *Attorney, Agent, or Firm* — Osha Bergman Watanabe & Burton LLP

(57) ABSTRACT

A wireless communication device according to the disclosure includes a communication unit, a storage unit, and a control unit. The control unit includes a monitoring section that monitors strength of a radio signal transmitted by a currently-connected access point, a determination section that retrieves information indicating correspondence between information on a travel route of the wireless communication device and a candidate for a switching destination access point from the storage unit and determines a connection destination access point based on the information retrieved, and a connection section that executes connection processing to the connection destination access point determined, when the strength of the radio signal transmitted by the currently-connected access point falls outside a threshold value.

8 Claims, 11 Drawing Sheets

| PREVIOUSLY CONNECTED ACCESS POINT | CONNECTED ACCESS POINT | SWITCHING DESTINATION ACCESS POINT | MAC ADDRESS OF SWITCHING DESTINATION ACCESS POINT | ... |
|---|---|---|---|---|
| AP#1 | AP#2 | AP#3 | MAC#3 | ... |
| AP#2 | AP#3 | AP#4 | MAC#4 | ... |
| AP#3 | AP#4 | AP#5 | MAC#5 | ... |
| ... | ... | ... | ... | ... |

FIG. 4

| CONNECTED ACCESS POINT | CONNECTION SWITCHING TIME | SWITCHING DESTINATION ACCESS POINT | ... |
|---|---|---|---|
| AP#1 | TIME#11 | AP#3 | ... |
|  | TIME#12 | AP#4 | ... |
|  | ... | ... | ... |
| AP#2 | TIME#21 | AP#1 | ... |
|  | TIME#22 | AP#3 | ... |
|  | ... | ... | ... |
| ... | ... | ... | ... |

FIG. 5

| CONNECTED ACCESS POINT | SWITCHING DESTINATION ACCESS POINT | INTER-ACCESS POINT DISTANCE |
|---|---|---|
| AP#1 | AP#2 | D#12 |
| | AP#3 | D#13 |
| | ... | ... |
| AP#2 | AP#1 | D#21 |
| | AP#3 | D#23 |
| | ... | ... |
| AP#3 | AP#1 | D#31 |
| | AP#2 | D#32 |
| | ... | ... |

FIG. 6

WIRELESS COMMUNICATION DEVICE, WIRELESS COMMUNICATION SYSTEM, WIRELESS COMMUNICATION CONNECTION METHOD, AND PROGRAM

CROSS-REFERENCE TO RELATED APPLICATIONS

This application claims the benefit of priority to Japanese Patent Application Number 2022-035421 filed on Mar. 8, 2022. The entire contents of the above-identified application are hereby incorporated by reference.

TECHNICAL FIELD

The disclosure relates to a wireless communication device, wireless communication system, wireless communication connection method, and program.

RELATED ART

When a wireless Local Area Network (LAN) is used for communication in a movable product such as a train or an automobile, or as an infrastructure for information transmission among workers in a large-scale plant, it is necessary to install a plurality of wireless LAN access points. In this case, there is a need for a technology to maintain communication of a terminal when the terminal is traveling between access points (hereinafter referred to as a handover technology).

In a wireless LAN, processing from the searching for access points to the determination of a connection destination access point may use the processing defined in Institute of Electrical and Electronics Engineers (IEEE) 802.11k. In this case, information on a switching destination access point is collected from a currently-connected access point, and when handover is required, the connection is switched from the currently-connected access point to the switching destination access point. If there is a plurality of candidates for a switching destination access point, a handover time required for switching between access points can be reduced. On the other hand, if there is only one switching destination access point, there is no significant difference in the handover time.

CITATION LIST

Patent Document

Patent Document 1: JP 4880546 B

SUMMARY

When the handover is performed in this manner, shortening the time used for switching between access points is required. In view of the above problem, an object of the disclosure is to provide a wireless communication device, a wireless communication system, a wireless communication connection method, and a program that can shorten the time used for switching between access points.

In order to solve the problem and achieve the object described above, a wireless communication device according to the disclosure includes a communication unit, a storage unit, and a control unit. The control unit includes a monitoring section that monitors strength of a radio signal transmitted by a currently-connected access point, a determination section that retrieves information indicating correspondence between a travel route of the wireless communication device and a candidate for a switching destination access point from the storage unit and determines a connection destination access point based on the information retrieved, and a connection section that executes connection processing to the connection destination access point determined, when the strength of the radio signal transmitted by the currently-connected access point falls outside a threshold value.

In order to solve the problem and achieve the object described above, a wireless communication system according to the disclosure includes the wireless communication device, and a server device including a switching destination access point storage section. The wireless communication device receives the information from the server device and stores the information in the switching destination access point storage section of the wireless communication device.

In order to solve the problem and achieve the object described above, a wireless communication connection method according to the disclosure includes monitoring strength of a radio signal transmitted by a currently-connected access point, retrieving information indicating correspondence between information on a travel route of a wireless communication device and a candidate for a switching destination access point from a storage unit and determining a connection destination access point based on the information retrieved, and executing connection processing to the connection destination access point determined, when the strength of the radio signal transmitted by the currently-connected access point falls outside a threshold value.

In order to solve the problem and achieve the object described above, a program according to the disclosure causes a computer to execute monitoring the strength of a radio signal transmitted by a currently-connected access point, retrieving information indicating correspondence between information on a travel route of a wireless communication device and a candidate for a switching destination access point from a storage unit and determining a connection destination access point based on the information retrieved, and executing connection processing to the connection destination access point determined, when the strength of the radio signal transmitted by the currently-connected access point falls outside a threshold value.

According to the disclosure, a wireless communication device, a wireless communication system, a wireless communication connection method, and a program that can shorten the time used for switching between access points can be provided.

BRIEF DESCRIPTION OF DRAWINGS

The disclosure will be described with reference to the accompanying drawings, wherein like numbers reference like elements.

FIG. 4 is a diagram illustrating an example of information stored in a switching destination access point storage section according to the disclosure.

FIG. 5 is a diagram illustrating an example of information stored in a connection history storage section according to the disclosure.

FIG. 6 is a diagram illustrating an example of information stored in an inter-access point distance storage section according to the disclosure.

DESCRIPTION OF EMBODIMENTS

Figure 1:
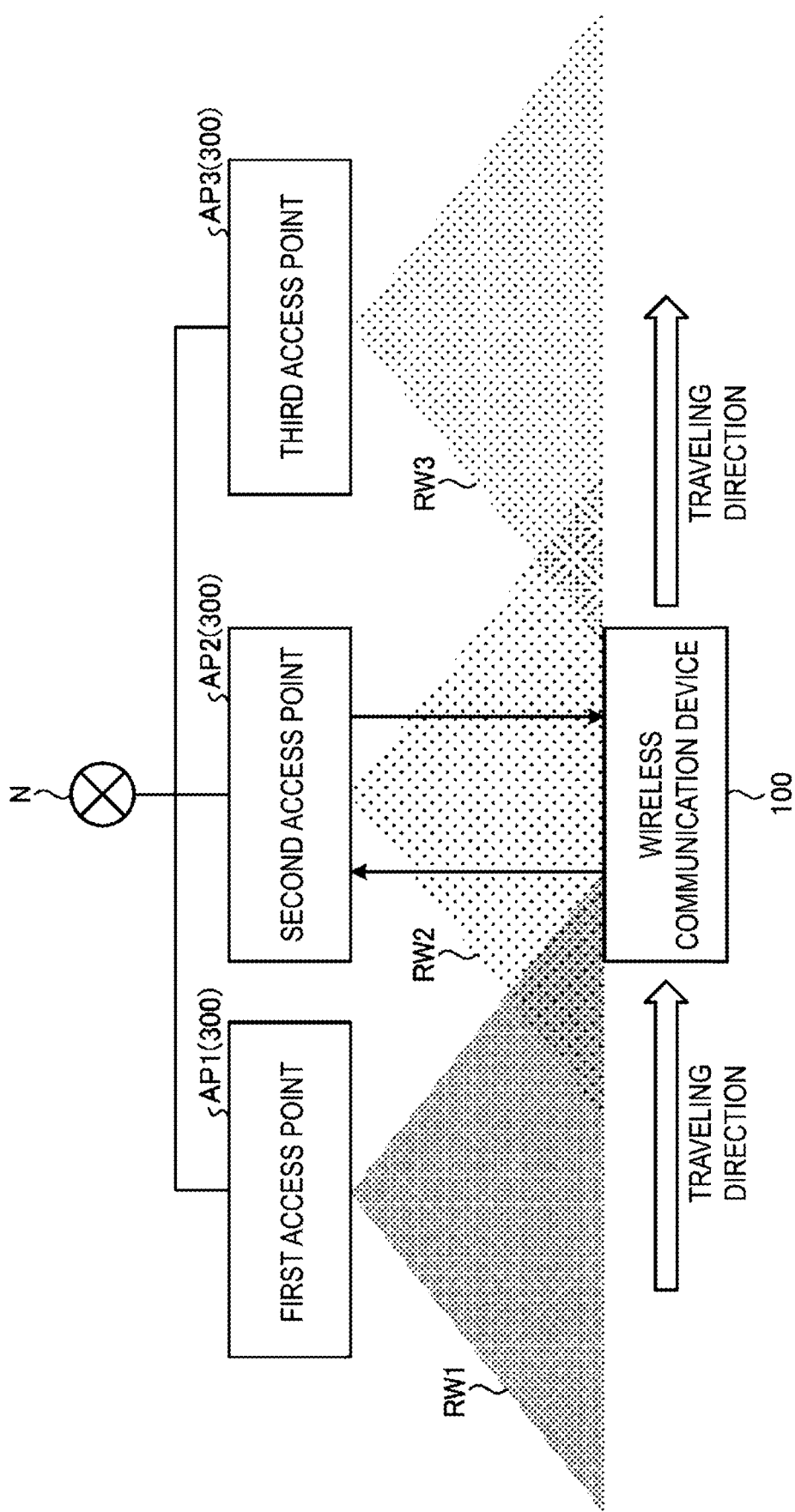
FIG. 1 is a diagram schematically illustrating switching between access points in a wireless communication device.

Hereinafter, embodiments according to the disclosure will be described in detail with reference to the drawings. Note that the disclosure is not limited by the embodiments to be described below.
Switching Between Access Points FIG. 1 is a diagram schematically illustrating switching between access points in a wireless communication device. As illustrated in FIG. 1, a first access point AP1 (300), a second access point AP2 (300), and a third access point AP3 (300) connected to a network N transmit radio waves RW1, RW2, and RW3, respectively. As illustrated in FIG. 1, when a wireless communication device 100 is located within a receivable range of the radio wave RW2 of the second access point AP2 (300), the wireless communication device 100 connects to the second access point AP2 (300). However, when the wireless communication device 100 continues to move along the traveling direction illustrated in FIG. 1, the wireless communication device 100 departs from the receivable range of the radio wave RW2 of the second access point AP2 (300) and thus cannot maintain the connection with the second access point AP2 (300). Thus, the wireless communication device 100 needs to connect to an access point different from the second access point AP2 (300).

In such a case, the wireless communication device 100 sends a request for information on neighboring access points (Neighbor Request) to the currently-connected access point, for example, the second access point AP2 (300) illustrated in FIG. 1. The second access point AP2 (300) that has received the request transmits the information on the neighboring access points (Neighbor Report) to the wireless communication device 100. When there is a plurality of candidates for a switching destination access point in the Neighbor Report received, the wireless communication device 100 selects one access point based on information on radio signal strength included in the Neighbor Report. In the example illustrated in FIG. 1, it is assumed that the wireless communication device 100 has selected the third access point AP3 (300). In that case, the wireless communication device 100 executes authentication processing (Authentication Request) with respect to the third access point AP3 (300). Then, when there is a response (Authentication Response) from the third access point AP3 (300) to which the wireless communication device 100 has executed the connection processing, the wireless communication device 100 sends an Association Request to the third access point AP3 (300) from which the response has been received. When there is a connection permission response (Association Response) from the third access point AP3 (300), both of the wireless communication device 100 and the third access point AP3 (300) exchange encryption keys for communication, and the connection is completed.

First Embodiment

Configuration of Wireless Communication System

Figure 2:
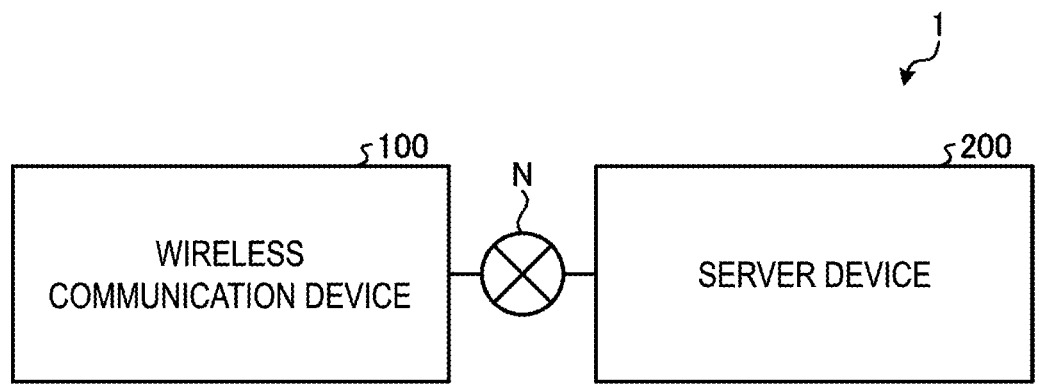
FIG. 2 is a diagram illustrating a configuration example of a wireless communication system according to the disclosure.

FIG. 2 is a diagram illustrating a configuration example of a wireless communication system according to the disclosure. As illustrated in FIG. 2, a wireless communication system 1 according to the disclosure includes a wireless communication device 100 and a server device 200. Note that the wireless communication system 1 illustrated in FIG. 2 may be configured to include a plurality of wireless communication devices 100 and/or a plurality of server devices 200. The wireless communication device 100 and the server device 200 are communicably connected to each other via a predetermined communication network (network N) in a wired or wireless manner.

The wireless communication device 100 may be an information processing device that is mounted on a mobile body such as a train, an automobile, or a disaster management vehicle and establish wireless communication with a device or the like outside the mobile body. Alternatively, the wireless communication device 100 may be, for example, a portable information processing device that can perform wireless communication with an external device or the like, such as a smartphone, a tablet terminal, a laptop PC, a mobile phone, or a Personal Digital Assistant (PDA).

Figure 3:
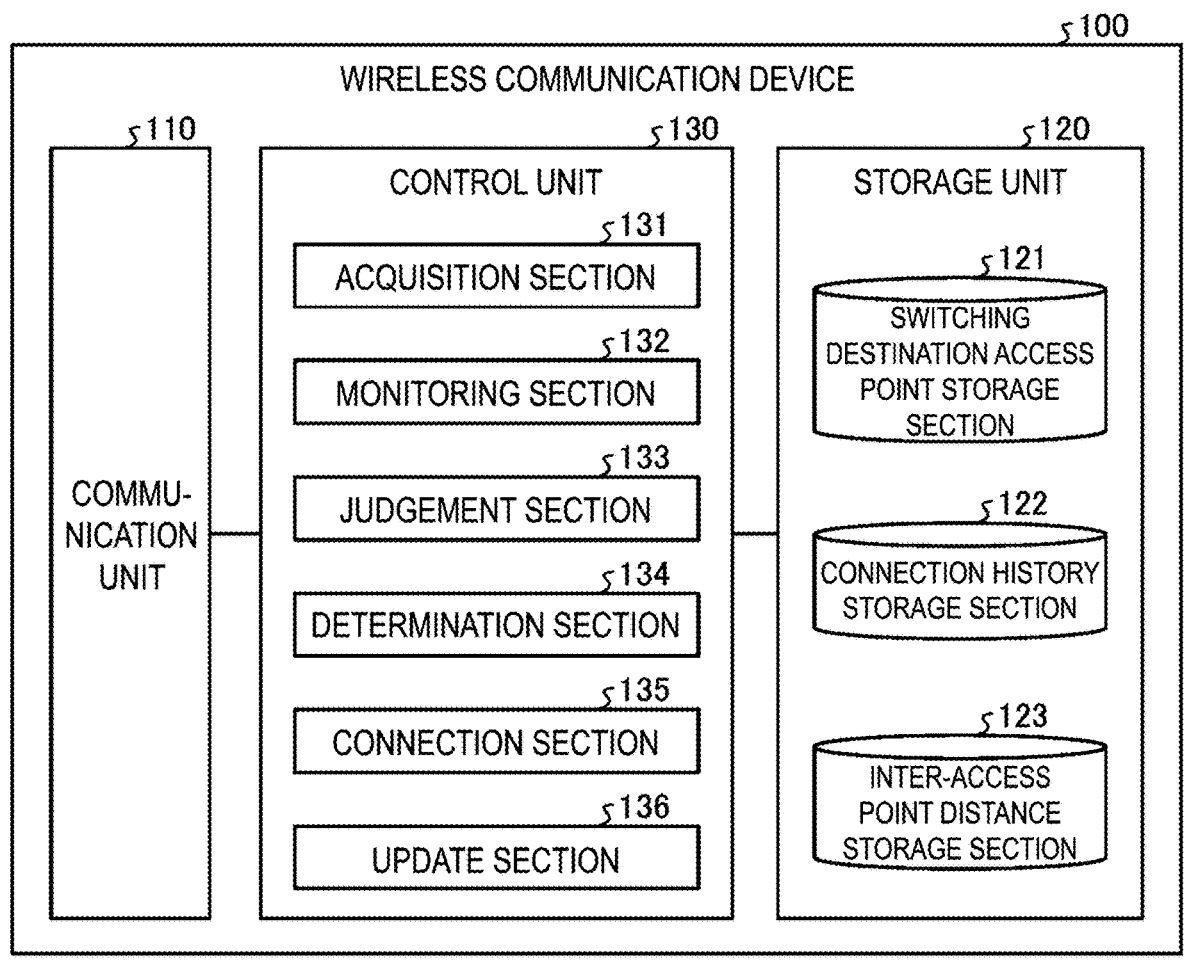
FIG. 3 is a diagram illustrating a configuration example of a wireless communication device according to the disclosure.

The server device 200 may be, for example, an information processing device such as a Personal Computer (PC), a Work Station (WS), or a computer having a server function. For example, the server device 200 executes processing based on information transmitted from the wireless communication device 100 via the network N.
Configuration of Wireless Communication Device A configuration of the wireless communication device 100 according to the disclosure will be described below by using FIG. 3. FIG. 3 is a diagram illustrating a configuration example of a wireless communication device according to the disclosure. As illustrated in FIG. 3, the wireless communication device 100 includes a communication unit 110, a storage unit 120, and a control unit 130. Although not illustrated in FIG. 3, the wireless communication device 100 may include an input unit (for example, a keyboard or a mouse) that receives various types of operations from a user of the wireless communication device 100, and an output unit (for example, a liquid crystal display) for outputting various types of information.
Communication Unit 110

The communication unit 110 is implemented by, for example, an electronic circuit that establishes wireless communication connection such as a Network Interface Card (NIC) or a wireless LAN card. The communication unit 110 may include an antenna that transmits and receives radio waves. The frequency of radio waves used for wireless communication by the communication unit 110 may be, for example, 5 GHz band, or 2.4 GHz band. The communication unit 110 is connected wirelessly to the network N and transmits and receives information to/from an access point and the server device 200.
Storage Unit 120

The storage unit 120 is implemented by, for example, a semiconductor memory element such as a Random Access Memory (RAM) or a Flash Memory, or a storage device such as a hard disk or a Solid State Drive (SSD). As illustrated in FIG. 3, the storage unit 120 includes a switching destination access point storage section 121, a connection history storage section 122, and an inter-access point distance storage section 123.

Switching Destination Access Point Storage Section 121

The switching destination access point storage section 121 stores information on a switching destination access point for each travel route of the wireless communication device 100 (hereinafter described as switching destination information). The switching destination information can be said to be information indicating correspondence between a travel route of the wireless communication device 100 and candidates for a switching destination access point. The access points (switching destination access points) to be connected to next serve as candidates for a switching destination access point. Here, an example of the switching destination information stored in the switching destination access point storage section 121 will be described below by using FIG. 4. FIG. 4 is a diagram illustrating an example of the switching destination information stored in the switching destination access point storage section according to the disclosure.

In the example illustrated in FIG. 4, the switching destination access point storage section 121 stores respective information corresponding to items of "previously connected access point", "connected access point", "switching destination access point" and "MAC address of switching destination access point" in association with each other as the switching destination information.

The "previously connected access point" is information indicating an access point to which the wireless communication device 100 has been connected immediately before the connection to the currently-connected access point. The "connected access point" is information indicating an access point to which the wireless communication device 100 is currently connected. The "switching destination access point" is information indicating a candidate for an access point to which the connection is switched from the currently-connected access point. The "MAC address of switching destination access point" is information indicating the Media Access Control (MAC) address of a switching destination access point.

That is, FIG. 4 indicates that the "previously connected access point" is AP #1, the "connected access point" is AP #2, the "switching destination access point" is AP #3, and the "MAC address of switching destination access point" is MAC #3.

Note that the switching destination information stored in the switching destination access point storage section 121 is not limited to the information corresponding to the items of the "previously connected access point", the "connected access point", the "switching destination access point", and the "MAC address of switching destination access point", and any information other than those above may be stored. For example, in order to respond to a case where the travel route of the wireless communication device 100 varies by day and time, information on a valid time indicating a time period during which information on a switching destination access point is valid may be stored in the switching destination access point storage section 121 as the switching destination information.

Connection History Storage Section 122

The connection history storage section 122 stores information on the connection history of the wireless communication device 100 to access points (hereinafter described as history information). The history information is information indicating access points connected in the past and, for example, may be information indicating correspondence between a connected access point and a subsequently connected access point in the past. Here, an example of the history information stored in the connection history storage section 122 will be described below by using FIG. 5. FIG. 5 is a diagram illustrating an example of the history information stored in the connection history storage section according to the disclosure.

In the example illustrated in FIG. 5, the connection history storage section 122 stores respective information corresponding to items of "connected access point", "connection switching time", and "switching destination access point" in association with each other as the history information.

The "connected access point" is information indicating an access point to which the wireless communication device 100 has been connected at a certain point in time. The "connection switching time" is information indicating a time at which the wireless communication device 100 has switched the connection from a connected access point to a switching destination access point. The "switching destination access point" is information indicating an access point to which the wireless communication device 100 has switched the connection from a connected access point to the switching destination access point.

That is, FIG. 5 indicates that the connection has been switched from the "connected access point" AP #1 to the "switching destination access point" AP #3 at the "connection switching time" TIME #11.

Note that the history information stored in the connection history storage section 122 is not limited to the information corresponding to the items of the "connected access point", the "connection switching time", and the "switching destination access point", and any information other than those above may be stored.

Inter-Access Point Distance Storage Section 123

The inter-access point distance storage section 123 stores information on a distance between access points (hereinafter described as distance information). The distance information is information indicating a distance between access points connected in the past and, for example, may be information indicating the distance between a connected access point and a subsequently connected access point in the past. Here, an example of the distance information stored in the inter-access point distance storage section 123 will be described below by using FIG. 6. FIG. 6 is a diagram illustrating an example of the distance information stored in the inter-access point distance storage section according to the disclosure.

In the example illustrated in FIG. 6, the inter-access point distance storage section 123 stores respective information corresponding to items of "connected access point", "switching destination access point" and "inter-access point distance" in association with each other as the distance information.

The "connected access point" is information indicating an access point to which the wireless communication device 100 has been connected at a certain point in time. The "switching destination access point" is information indicating candidates for an access point to which the wireless communication device 100 has switched the connection from a connected access point. The "inter-access point distance" is information indicating the distance from a "connected access point" to a "switching destination access point". Note that the inter-access point distance may be a physical distance or a rounded distance (approximate distance scale set by an administrator).

That is, FIG. 6 indicates that when the "connected access point" is AP #1, the "switching destination access point" is AP #2 or AP #3, and the "inter-access point distance" between AP #1 and AP #2 or between AP #1 and AP #3 is D #12 or D #13, respectively.

Note that the distance information stored in the inter-access point distance storage section 123 is not limited to the information corresponding to the items of the "connected access point", the "switching destination access point", and the "inter-access point distance", and any information other than those above may be stored.

Control Unit 130

Next, returning to FIG. 3, the control unit 130 will be described. The control unit 130 is implemented by a Central Processing Unit (CPU) or a Micro Processing Unit (MPU) executing various types of programs stored in a storage device of the wireless communication device 100 by using a RAM as a work area. Alternatively, the control unit 130 may be implemented by, for example, an integrated circuit such as an Application Specific Integrated Circuit (ASIC) or a Field Programmable Gate Array (FPGA).

As illustrated in FIG. 3, the control unit 130 includes an acquisition section 131, a monitoring section 132, a judgement section 133, a determination section 134, a connection section 135, and an update section 136.

Acquisition Section 131

The acquisition section 131 retrieves the switching destination information stored in advance in the switching destination access point storage section 121 from the switching destination access point storage section 121. In addition, the acquisition section 131 may retrieve the history information stored in advance in the connection history storage section 122 from the connection history storage section 122. Further, the acquisition section 131 may retrieve the distance information stored in advance in the inter-access point distance storage section 123 from the inter-access point distance storage section 123.

Monitoring Section 132

The monitoring section 132 monitors strength of a radio signal transmitted by the access point to which the wireless communication device 100 is currently connected. That is, the monitoring section 132 receives a radio wave of a wireless LAN transmitted by the currently-connected access point via the communication unit 110 and monitors the signal level of the radio wave. In other words, the monitoring section 132 measures the strength of the radio signal of the wireless LAN received by the communication unit 110 from the currently-connected access point.

Judgement Section 133

The judgement section 133 compares the strength of the radio signal measured by the monitoring section 132 to a threshold value and judges whether the strength of the radio signal received by the wireless communication device 100 is equal to or less than the threshold value. Here, the threshold value may be set in advance, and a plurality of threshold values may be set.

Determination Section 134

When the judgement section 133 judges that the strength of the radio signal received by the communication unit 110 of the wireless communication device 100 is equal to or less than the threshold value, the determination section 134 determines a connection destination access point based on the switching destination information retrieved from the switching destination access point storage section 121. That is, the determination section 134 retrieves the switching destination information and determines, as a connection destination access point, a switching destination access point of the switching destination information associated with the previously connected access point and the connected access point that match the previously connected access point and the currently-connected access point of the wireless communication device 100, respectively.

When there is a plurality of candidates for a switching destination access point for each travel route, the determination section 134 may determine a connection destination access point based on a connection priority of each access point. That is, when the switching destination information includes a plurality of candidates for a switching destination access point, the determination section 134 determines the connection priority of each access point and, among the plurality of candidates for a switching destination access point, determines a switching destination access point that has been determined to have the highest connection priority as a connection destination access point. Note that the processing of determining the connection priority by the determination section 134 may be, for example, processing to be described below.

The determination section 134 calculates a connection priority based on the connection history of the wireless communication device 100. The determination section 134 retrieves the history information stored in the connection history storage section 122, refers to the access point to which the wireless communication device 100 has been connected and to the corresponding connection switching times, and gives a higher connection priority to an access point to which the wireless communication device 100 has connected at a time closer to the current time. That is, the determination section 134 gives a high connection priority to the access point to which the wireless communication device 100 has been connected before the connection to the currently-connected access point.

The determination section 134 may calculate a connection priority based on a distance from the currently-connected access point to a switching destination access point. In that case, the determination section 134 retrieves the distance information stored in the inter-access point distance storage section 123, refers to an inter-access point distance between the access point to which the wireless communication device 100 is currently connected and switching destination access points, and gives a higher connection priority to a switching destination access point which is closer in distance to the currently-connected access point. That is, the determination section 134 determines a higher connection priority for a switching destination access point closer to the currently-connected access point.

When there is no candidate for a switching destination access point corresponding to a travel route of the wireless communication device 100, the determination section 134 determines a connection destination access point by communicating with neighboring access points. That is, the determination section 134 makes a request for information on a switching destination access point to the access point to which the wireless communication device 100 is currently connected. The access point that has received the request transmits, as the information on a switching destination access point, information such as an Extended Service Set Identifier (ESSID), a Basic Service Set Identifier (BSSID), or a channel to the wireless communication device 100. When the wireless communication device 100 receives the above information, the wireless communication device 100 determines an access point to connect to, based on information on radio signal strength included in the information regarding a switching destination access point received and executes connection processing (Authentication Request) to the access point determined. Then, both of the wireless communication device 100 and the access point exchange encryption keys for communication, and the connection is completed.

Here, the ESSID is a network identifier in a wireless LAN defined in IEEE 802.11. The ESSID can be freely set by an administrator of an access point and is composed of up to 32 alphanumeric characters. The BSSID is one of network identifiers in a wireless LAN defined in IEEE 802.11. The BSSID is a 48-bit number and usually is identical to a MAC address of an access point. The channel is obtained by dividing a frequency band occupied by a wireless LAN into predetermined frequency bands.

Connection Section 135

The connection section 135 executes connection processing to the determined connection destination access point when the strength of the radio signal transmitted by the currently-connected access point falls outside a threshold value. That is, the connection section 135 executes connection processing to the determined connection destination access point. The connection section 135 sends an Authentication Request to the connection destination access point by using the BSSID or the MAC address of the connection destination access point determined by the determination section 134. When the connection section 135 receives a response (Authentication Response) from the connection destination access point, the connection section 135 disconnects the connection with the currently-connected access point, sends connection processing (Association Request) to the connection destination access point, and establish connection with the connection destination access point.

Update Section 136

The update section 136 stores a travel route of the wireless communication device 100 and connected access points in association with each other in the storage unit 120. Specifically, after the connection section 135 has completed connection processing to a new access point, the wireless communication device 100 adds information of a previously connected access point, a currently-connected access point, a switching destination access point, and the MAC address of the switching destination access point, at the time of the connection processing, that are associated with each other to the switching destination information, and thereby the update section 136 updates the switching destination information and stores the updated switching destination information in the switching destination access point storage section 121.

Alternatively, the update section 136 may store a currently-connected access point, a connection switching time, and a switching destination access point in association with each other in the storage unit 120. Specifically, after the connection section 135 has completed connection processing to a new access point, the update section 136 adds information of a currently-connected access point, a connection switching time, and a switching destination access point, at the time of the connection processing, that are associated with each other to the history information, and thereby the update section 136 updates the history information and stores the updated history information in the connection history storage section 122.

Configuration of Access Point

Figure 7:
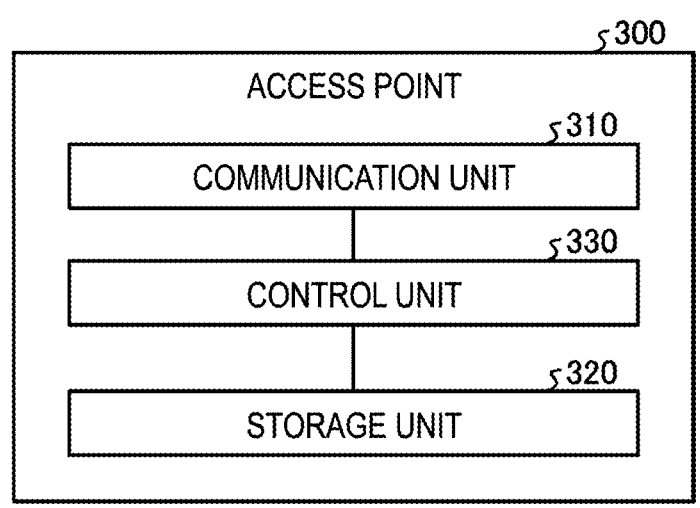
FIG. 7 is a diagram illustrating a configuration example of an access point according to the disclosure.

Next, a configuration of an access point according to the disclosure will be described by using FIG. 7. FIG. 7 is a diagram illustrating a configuration example of an access point according to the disclosure. As illustrated in FIG. 7, an access point 300 includes a communication unit 310, a storage unit 320, and a control unit 330.

The communication unit 310 is an electronic circuit that enables wireless communication between an access point and an external device. The communication unit 310 may be implemented by NIC, for example. The frequency of radio waves used for communication by the communication unit 310 may be, for example, 5 GHz band, or 2.4 GHz band. The communication unit 310 may include an antenna that transmits and receives radio waves.

The storage unit 320 is implemented by, for example, a semiconductor memory element such as a RAM or a flash memory, or a storage device such as a hard disk or an SSD. The storage unit 320 includes information such as an ESSID, a MAC address, a channel, an encryption mode, and an encryption key.

The control unit 330 is implemented by a CPU, an MPU, or the like executing various types of programs stored in a storage device of the access point 300 by using a RAM as a work area. The control unit 330 may be implemented by an integrated circuit such as an ASIC or an FPGA, for example.

Wireless Communication Connection Processing

Figure 8:
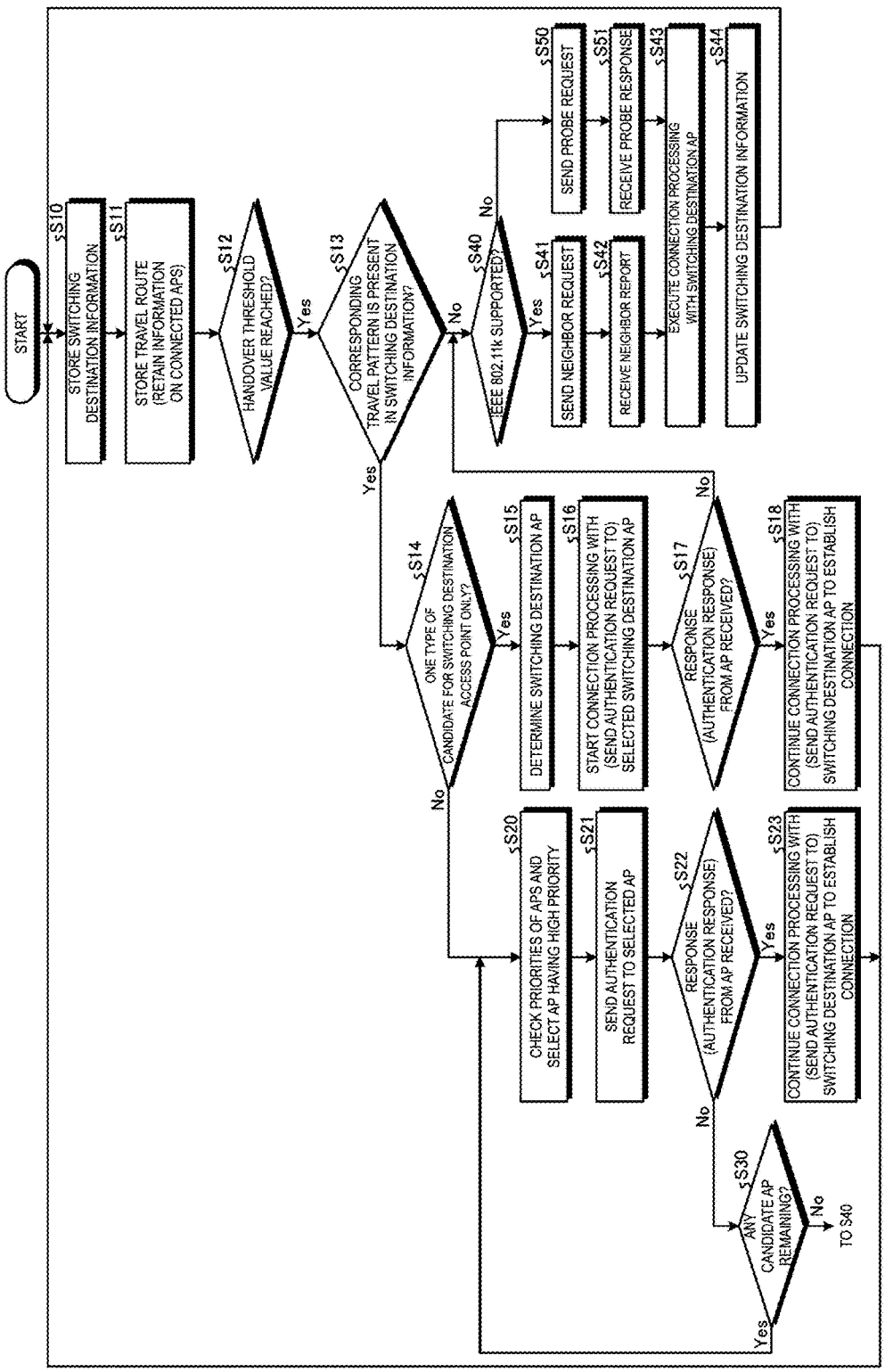
FIG. 8 is a diagram illustrating a flowchart of wireless communication connection processing according to a first aspect of a first embodiment.

The process of the above-described wireless communication connection of the wireless communication device 100 will be described with reference to a flowchart. FIG. 8 is a diagram illustrating a flowchart of wireless communication connection processing according to a first aspect of the first embodiment.

First, the wireless communication device 100 stores the switching destination information in the switching destination access point storage section 121 (step S10). Subsequently, the wireless communication device 100 stores the travel route of the wireless communication device 100 while traveling (step S11). Then, the wireless communication device 100 judges whether the radio signal strength of the radio signal from the currently-connected access point is equal to or lower than a handover threshold value (step S12).

When the radio signal strength is equal to or lower than the handover threshold value (step S12; YES), the wireless communication device 100 judges whether a travel route that matches the travel route of the wireless communication device 100 is stored in the switching destination information (table of switching destination access points) (step S13).

If a travel route that matches the travel route of the wireless communication device 100 is stored in the switching destination information (step S13; YES), the wireless communication device 100 judges whether there is only one type of candidate for a switching destination access point (step S14).

If there is only one type of candidate for a switching destination access point (step S14; YES), the wireless communication device 100 determines that switching destination access point as a connection destination access point (step S15). Then, the wireless communication device 100 starts connection processing (sends an Authentication Request) to the determined connection destination access point (step S16).

The wireless communication device 100 judges whether there is a response (Authentication Response) from the access point (step S17).

If there is a response (Authentication Response) from the access point (step S17; YES), the wireless communication device 100 continues the connection processing with the connection destination access point to establish connection (step S18). Then, the wireless communication device 100 stores the travel route of the wireless communication device 100 and the connection destination access point in association with each other in the connection history storage section 122 (step S10).

That is, if a switching destination access point is uniquely determined based on the travel route of the wireless communication device 100, processing of Neighbor Request and Neighbor Report defined in IEEE 802.11k, or processing of Probe Request and Probe Response is not performed.

This enables the wireless communication device 100 to shorten the time used for switching between access points. Further, the utilization rate of a computational resource such as a CPU or a RAM used for the processing of switching between access points can be also reduced.

Next, a case where NO is judged in step S14 will be described by using FIG. 8. In this case, the same processing as the above-described processing is executed from step S10 to step S14.

Then, if there are two or more types of candidates for a switching destination access point (step S14; NO), the wireless communication device 100 checks the connection priority of each access point and selects an access point having a high connection priority as the switching destination access point (step S20). Specifically, the wireless communication device 100 calculates the connection priority of each access point based on the distance information (information indicating the distance between access points). That is, the wireless communication device 100 acquires the distance between the currently-connected access point and a candidate for a switching destination access point based on the distance information, and determines a higher connection priority for a switching destination access point closer to the currently-connected access point. Then, the wireless communication device 100 determines the switching destination access point having the highest priority as a connection destination access point. Alternatively, the wireless communication device 100 may calculate the connection priority of each access point based on the history information (information indicating the connection history of the wireless communication device 100). In this case, based on the history information, the wireless communication device 100 refers to the connection history of access points, and gives a high connection priority to an access point connected before the connection to the currently-connected access point. Then, the wireless communication device 100 determines a switching destination access point having the highest connection priority as a connection destination access point.

Then, the wireless communication device 100 starts connection processing (sends an Authentication Request) to the access point selected in step S20 (step S21). Then, the wireless communication device 100 judges whether there is a response (Authentication Response) from the access point (step S22).

If there is a response (Authentication Response) from the access point (step S22; YES), the wireless communication device 100 continues the connection processing with the connection destination access point to establish connection (step S23). Then, the wireless communication device 100 stores the travel route of the wireless communication device 100 and the connection destination access point in the connection history storage section 122 (step S10).

Note that if there is no response (Authentication Response) from the access point in step S22 (step S22; NO), the wireless communication device 100 judges whether there are remaining candidates for a switching destination access point (step S30).

If there are remaining candidates for a switching destination access point (step S30; YES), the wireless communication device 100 returns to step S20 to check a priority of each of the remaining candidates and selects an access point having a high priority (step S20). Then, the wireless communication device 100 executes the processing operations from step S20 to step S22, and step S30 until there is a response from the access point.

If there are no more access point candidates (step S30; NO), the wireless communication device 100 judges whether the wireless communication device 100 supports IEEE 802.11k (step S40). Then, if the wireless communication device 100 supports IEEE 802.11k (step S40; YES), the wireless communication device 100 transmits a Neighbor Request to the currently-connected access point (step S41). Then, the wireless communication device 100 receives a Neighbor Response from the currently-connected access point (step S42). The Neighbor Response includes information such as a BSSID and a channel of each neighboring access point. Based on the information on a switching destination access point included in the Neighbor Response, the wireless communication device 100 executes connection processing to the switching destination access point (step S43). Then, the wireless communication device 100 stores information on the travel route of the wireless communication device 100 and the connection destination access point in the connection history storage section 122 (step S44).

On the other hand, if the wireless communication device 100 does not support IEEE 802.11k in step S40 (step S40; NO), the wireless communication device 100 sends a Probe Request to neighboring access points (step S50). Then, when the wireless communication device 100 receives a Probe Response from a neighboring access point (step S51), the wireless communication device 100 executes connection processing to the access point based on the information of the Probe Response (step S43). The Probe Response transmitted from the access point includes information such as a BSSID, a SSID, and a channel. Then, the wireless communication device 100 stores information on the travel route of the wireless communication device 100 and the connection destination access point in the connection history storage section 122 (step S44).

As described above, if there is a plurality of candidates for a switching destination access point, a connection destination access point is determined based on the connection priority, and connection processing is executed with respect to the connection destination access point. Then, only if there are no more candidates for a switching destination access point, the processing defined in IEEE 802.11k or the processing of Probe Request and Probe Response is executed.

This enables the wireless communication device 100 to shorten the time used for switching between access points.

Figure 9:
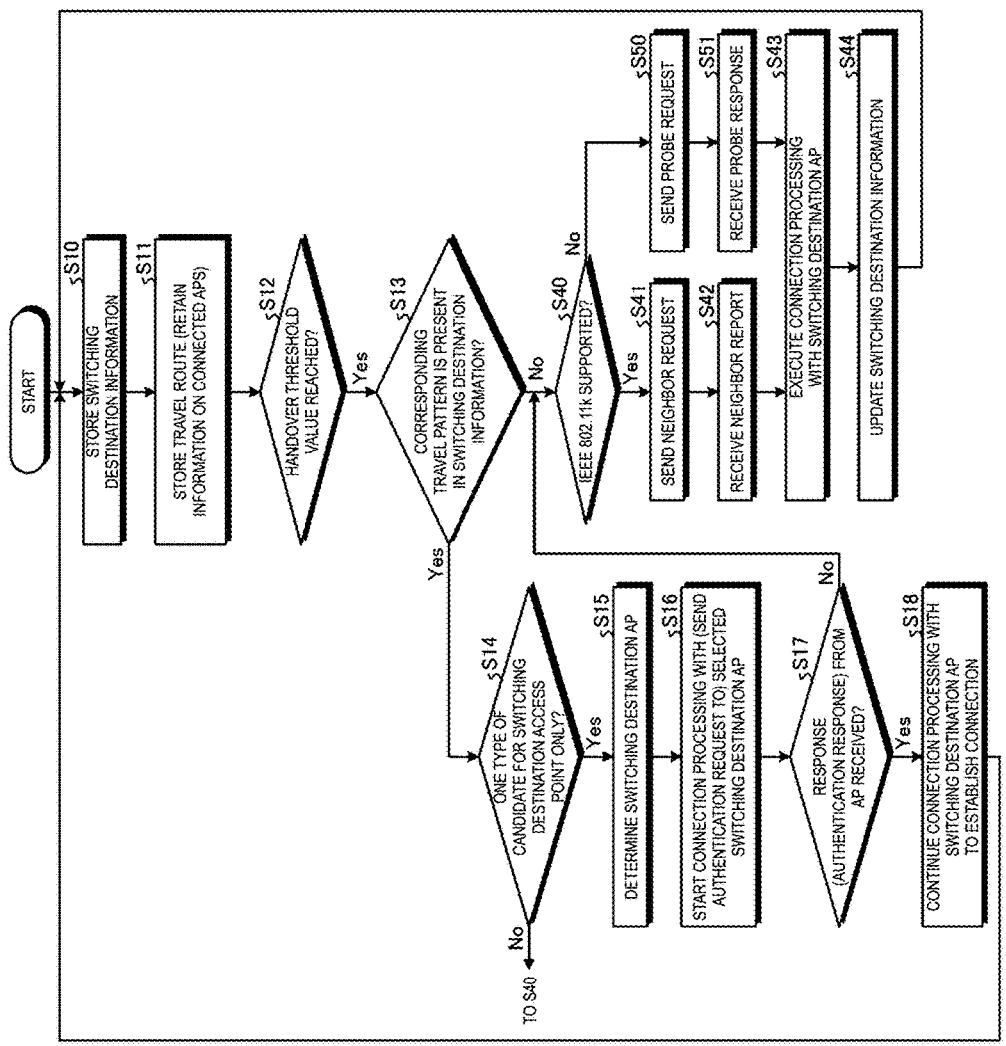
FIG. 9 is a diagram illustrating a flowchart of wireless communication connection processing according to a second aspect of the first embodiment.

Next, wireless communication connection processing according to a second aspect of the first embodiment will be described by using FIG. 9. FIG. 9 is a diagram illustrating a flowchart of wireless communication connection processing according to the second aspect of the first embodiment. In the wireless communication connection processing according to the second aspect of the first embodiment, the same processing operations as the processing in the wireless communication connection processing according to the first aspect of the first embodiment is executed from step S10 to step S14 as illustrated in FIG. 9. Thus, processing different from the processing according to the first aspect of the first embodiment will be described below.

First, the wireless communication device 100 executes the processing operations of step S10 to step S14 illustrated in FIG. 9. If there are two or more types of candidates for a switching destination access point (step S14; NO), the wireless communication device 100 judges whether the wireless communication device 100 supports IEEE 802.11k (step S40). If the wireless communication device 100 supports IEEE 802.11k (step S40; YES), the processing of searching for access points in accordance with IEEE 802.11k is executed (step S41 to step S43). The processing operations of step S41 to step S43 illustrated in FIG. 9 are identical to the processing operations of step S41 to step S43 illustrated in FIG. 8 described above, and thus descriptions thereof are omitted.

As described above, in the wireless communication connection processing according to the second aspect of the first embodiment, the processing defined in IEEE 802.11k or the processing of Probe Request and Probe Response is executed even if there is a plurality of candidates for a switching destination access point.

This eliminates the processing of determining a connection destination access point based on the connection priority in the wireless communication device 100 if there is a plurality of candidates for a switching destination access point. Accordingly, switching between access points can be executed even if there is a plurality of candidates for a switching destination access point.

Second Embodiment

Figure 10:
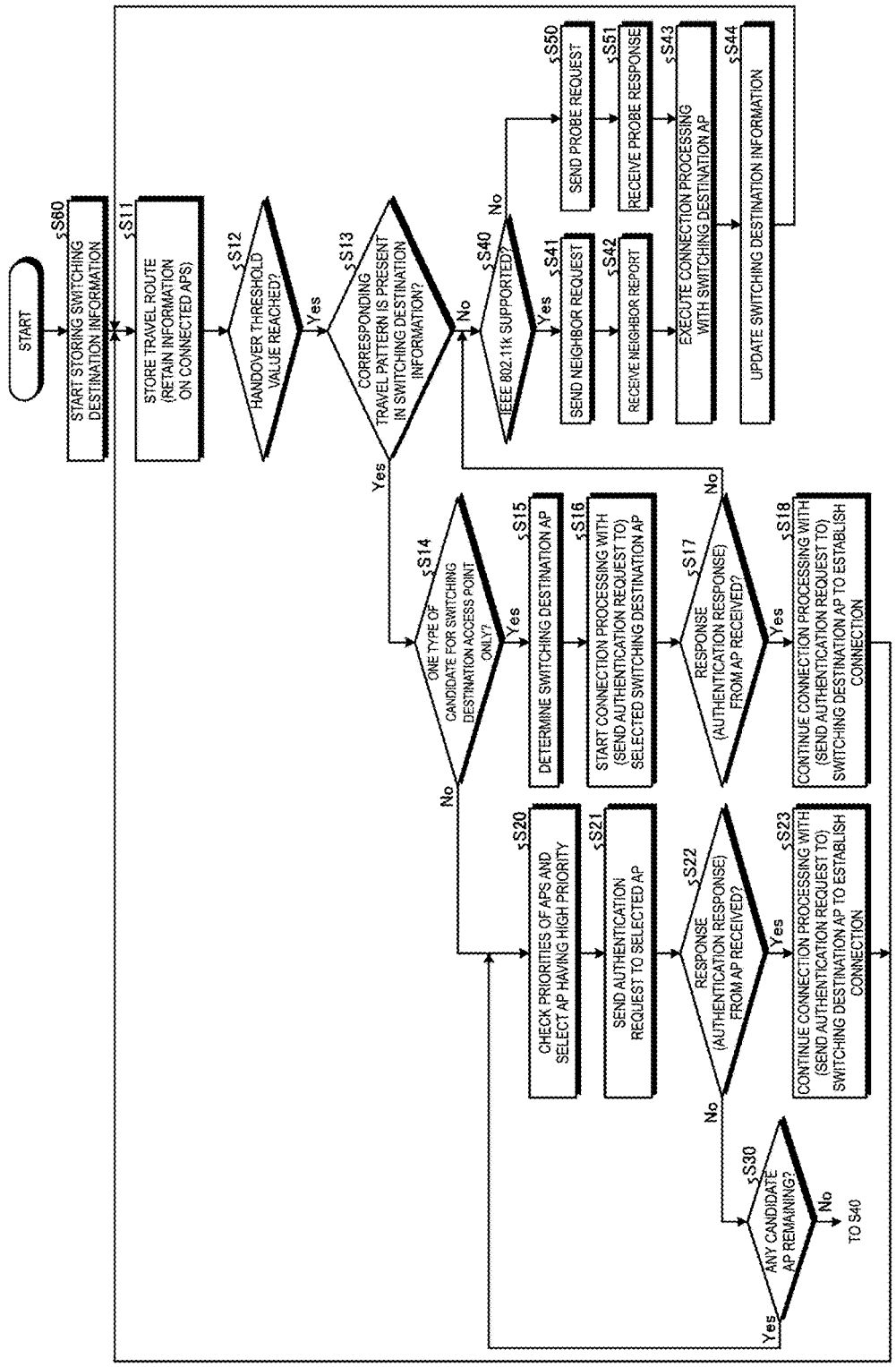
FIG. 10 is a diagram illustrating a flowchart of wireless communication connection processing according to a second embodiment.

Next, wireless communication connection processing according to a second embodiment will be described by using FIG. 10. FIG. 10 is a diagram illustrating a flowchart of the wireless communication connection processing according to the second embodiment.

The wireless communication connection processing according to the second embodiment differs from the wireless communication connection processing according to the first aspect of the first embodiment in that processing of storing the connection history of a switching destination access point, that is, the switching destination information (step S60) is executed before step S10. That is, in the wireless communication connection processing according to the second embodiment, if there is no candidate for a switching destination access point, and if the wireless communication device 100 supports IEEE 802.11k (step S40; YES), processing of searching for access points in accordance with IEEE 802.11k, connection processing, and processing of storing the connection history are executed as illustrated in FIG. 10 (step S41 to step S44). The processing operations of step S41 to step S43 illustrated in FIG. 10 are identical to the processing operations of step S41 to step S43 illustrated in FIG. 8 described above, and thus descriptions thereof are omitted.

On the other hand, if the wireless communication device 100 does not support IEEE 802.11k (step S40; NO), the wireless communication device 100 sends a Probe Request to neighboring access points, connects to an access point that has responded, and executes the processing of storing the connection history (from step S50 to step S51, step S43, and step S44). The processing operations from step S50 to step S51, step S43, and step S44 illustrated in FIG. 10 are identical to the processing operations from step S50 to step S51, step S43, and step S44 illustrated in FIG. 8 described above, and descriptions thereof are omitted.

As described above, in the wireless communication connection processing according to the second embodiment, even if the information on a switching destination access point is not stored in advance in the wireless communication device 100, the wireless communication device 100 executes, while traveling, connection processing to another access point each time switching is required and stores the connection history, and thereby accumulates the information on switching destination access points.

Accordingly, the wireless communication device 100 can appropriately switch between access points even in a place where the wireless communication device 100 has never traveled.

Third Embodiment

Next, wireless communication connection processing according to a third embodiment will be described. In the above-described embodiments, the switching destination information is stored in advance in the switching destination access point storage section 121, and the acquisition section 131 retrieves the switching destination information, but the disclosure is not limited thereto. For example, the acquisition section 131 may acquire the switching destination information from a server device 200 through communication and stores the obtained switching destination information in the switching destination access point storage section 121. The acquisition section 131 may retrieve the switching destination information stored in the switching destination access point storage section 121. Similarly, the acquisition section 131 may acquire the history information and the distance information from the server device 200 through communication and stores the acquired history information and the acquired distance information in the connection history storage section 122 and the inter-access point distance storage section 123, respectively. That is, in the wireless communication connection processing according to the third embodiment, the switching destination information, the history information, and the distance information are acquired from the server device 200 and respectively stored in the switching destination access point storage section 121, the connection history storage section 122, and the inter-access point distance storage section 123 in step S10 according to the first aspect of the first embodiment illustrated in FIG. 8 and the second aspect of the first embodiment illustrated in FIG. 9. The configuration of the server device 200 in this case will be described below.

Configuration of Server Device

Figure 11:
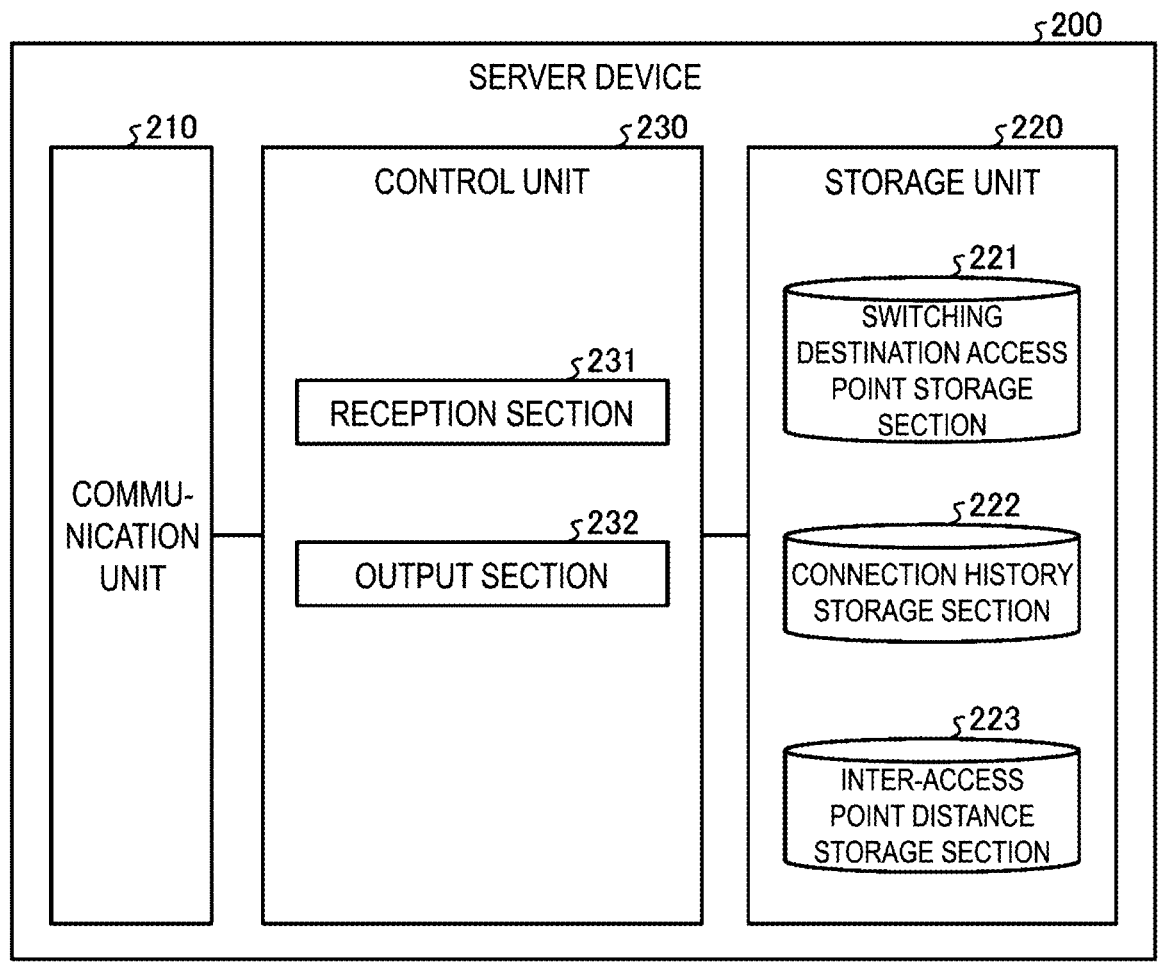
FIG. 11 is a diagram illustrating a configuration example of a server device according to the disclosure.

A configuration of the server device 200 according to the disclosure will be described by using FIG. 11. FIG. 11 is a diagram illustrating a configuration example of the server device according to the disclosure. As illustrated in FIG. 11, the server device 200 includes a communication unit 210, a storage unit 220, and a control unit 230.

The communication unit 210 is implemented by NIC, for example. The communication unit 210 is connected to the network N in a wired or wireless manner and transmits and receives various types of information to/from the wireless communication device 100 via the network N.

The storage unit 220 is implemented by, for example, a semiconductor memory element such as a RAM or a flash memory, or a storage device such as a hard disk or an SSD. As illustrated in FIG. 11, the storage unit 220 includes a switching destination access point storage section 221, a connection history storage section 222, and an inter-access point distance storage section 223.

The switching destination access point storage section 221 stores information on a switching destination access point for each travel route of the wireless communication device 100. The information stored in the switching destination access point storage section 221 is identical to the information stored in the switching destination access point storage section 121 of the wireless communication device 100, and thus descriptions thereof are omitted.

The connection history storage section 222 stores information on the connection history of the wireless communication device 100 to access points. The information stored in the connection history storage section 222 is identical to the information stored in the connection history storage section 122 of the wireless communication device 100, and thus descriptions thereof are omitted.

The inter-access point distance storage section 223 stores information on a distance between access points. The information stored in the inter-access point distance storage section 223 is identical to the information stored in the inter-access point distance storage section 123 of the wireless communication device 100, and thus descriptions thereof are omitted.

The control unit 230 is implemented by a CPU, an MPU, or the like executing various types of programs stored in a storage device of the server device 200 by using a RAM as a work area. Alternatively, the control unit 230 may be implemented by an integrated circuit such as an ASIC or an FPGA, for example.

As illustrated in FIG. 11, the control unit 230 includes a reception section 231 and an output section 232.

The reception section 231 receives an information providing request from a device outside the server device 200, for example, the wireless communication device 100 to the server device 200. For example, when the reception section 231 receives an information providing request for information on a switching destination access point from the wireless communication device 100, the reception section 231 retrieves information on a switching destination access point from the switching destination access point storage section 221 of the server device 200 and provides the information to the output section 232 to be described below.

The reception section 231 may receive an information providing request for information on the connection history from a device outside the server device 200, for example, the wireless communication device 100. For example, when the reception section 231 receives the information providing request regarding the connection history from the wireless communication device 100, the reception section 231 retrieves information on the connection history from the connection history storage section 222 of the server device 200 and provides the information to the output section 232 to be described below.

In addition, the reception section 231 may receive an information providing request for information on an inter-access point distance from a device outside the server device 200, for example, the wireless communication device 100. For example, when the reception section 231 receives the information providing request regarding the inter-access point distance from the wireless communication device 100, the reception section 231 retrieves information on an inter-access point distance from the inter-access point distance storage section 223 of the server device 200 and provides the information to the output section 232 to be described below.

The output section 232 outputs the information to the requester of the information providing request based on the information providing request received by the reception section 231. That is, when the output section 232 receives information matching the information providing request received by the reception section 231 from the reception section 231, the output section 232 outputs, that is, transmits the information matching the information providing request to the requester of the information providing request, for example, the wireless communication device 100 via the communication unit 210.

Configurations and Effects

A wireless communication device 100 according to the disclosure includes a communication unit 110, a storage unit 120, and a control unit 130. The control unit 130 includes a monitoring section 132 that monitors strength of a radio signal transmitted by a currently-connected access point, a determination section 134 that retrieves information indicating correspondence between a travel route of the wireless communication device 100 and a candidate for a switching destination access point from the storage unit 120 and determines a connection destination access point based on the information retrieved, and a connection section 135 that executes connection processing to the connection destination access point determined, when the strength of the radio signal transmitted by the currently-connected access point falls outside a threshold value.

According to this configuration, the wireless communication device 100 can switch between access points without using IEEE 802.11k, which uses long time to search for access points, and thus can shorten the time used for switching between access points. Further, the utilization rate of a computational resource such as a CPU or a RAM used for the processing of switching between access points can be also reduced.

When the information includes a plurality of candidates for the switching destination access point for each travel route, the determination section 134 of the wireless communication device 100 according to the disclosure determines a connection destination access point based on a connection priority of an access point.

According to this configuration, even when there is a plurality of candidates for a switching destination access point, the wireless communication device 100 can switch between access points without using IEEE 802.11k, which uses long time to search for access points. Accordingly, the time used for switching between access points can be shortened.

The storage unit 120 of the wireless communication device 100 according to the disclosure further includes a connection history storage section 122 that stores connection history of the wireless communication device 100 to access points, and the connection priority is calculated based on the connection history of the wireless communication device 100.

According to this configuration, when there is a plurality of candidates for a switching destination access point, the wireless communication device 100 can calculate the connection priority based on a clear criterion. This enables switching between access points without using IEEE 802.11k, which uses long time to search for access points. Accordingly, the time used for switching between access points can be shortened.

The storage unit 120 of the wireless communication device 100 according to the disclosure further includes an inter-access point distance storage section 123 that stores a distance between access points, and the connection priority is calculated based on a distance from a currently-connected access point to a switching destination access point.

According to this configuration, when there is a plurality of candidates for a switching destination access point, the wireless communication device 100 can calculate the connection priority based on a clear criterion.

When the information includes no candidate for the switching destination access point corresponding to the travel route of the wireless communication device 100, the determination section 134 of the wireless communication device 100 according to the disclosure determines the connection destination access point by communicating with neighboring access points, and the control unit 130 further includes an update section 136 that stores the travel route of the wireless communication device 100 and the connection destination access point in association with each other in the storage unit 120.

According to this configuration, even when there is a plurality of candidates for a switching destination access point, the wireless communication device 100 can appropriately determine a connection destination access point.

A wireless communication system 1 according to the disclosure includes the wireless communication device 100 and a server device 200 including a switching destination access point storage section 221. The wireless communication device 100 receives the information from the server device 200 and stores the information in the switching destination access point storage section 121 of the wireless communication device 100.

According to this configuration, the wireless communication device 100 can acquire the information on a switching destination access point from the server device 200 and thus can appropriately determine a switching destination access point even when the information on a switching destination access point is not stored in the wireless communication device 100.

The wireless communication connection method according to the disclosure includes monitoring strength of a radio signal transmitted by a currently-connected access point, retrieving information indicating correspondence between information on a travel route of a wireless communication device 100 and a candidate for a switching destination access point from a storage unit 120 and determining a connection destination access point based on the information retrieved, and executing connection processing to the connection destination access point determined, when the strength of the radio signal transmitted by the currently-connected access point falls outside a threshold value.

According to this configuration, the wireless communication device 100 can switch between access points without using IEEE 802.11k, which uses long time to search for access points, and thus can shorten the time used for switching between access points.

A program according to the disclosure causes a computer to execute monitoring strength of a radio signal transmitted by a currently-connected access point, retrieving information indicating correspondence between information on a travel route of a wireless communication device 100 and a candidate for a switching destination access point from a storage unit 120 and determining a connection destination access point based on the information retrieved, and executing connection processing to the connection destination access point determined, when the strength of the radio signal transmitted by the currently-connected access point falls outside a threshold value.

According to this configuration, the wireless communication device 100 can switch between access points without using IEEE 802.11k, which uses long time to search for access points, and thus can shorten the time used for switching between access points.

The embodiments of the disclosure are described above, but an embodiment is not limited by the details of the embodiments above. Furthermore, the constituent elements of the above-described embodiments include elements that are able to be easily conceived by a person skilled in the art, and elements that are substantially the same, that is, elements of an equivalent scope. Furthermore, the constituent elements described above can be appropriately combined. Furthermore, it is possible to make various omissions, substitutions, and changes to the constituent elements within a range not departing from the scope of the above-described embodiments.

While preferred embodiments of the invention have been described as above, it is to be understood that variations and modifications will be apparent to those skilled in the art without departing from the scope and spirit of the invention. The scope of the invention, therefore, is to be determined solely by the following claims.

The invention claimed is:

1. A wireless communication device comprising:
a communication unit;
a storage unit that stores switching destination information indicating correspondence between a travel route of the wireless communication device and a candidate switching destination access point, wherein
in the switching destination information, a connected access point at a certain time point is associated with a previously connected access point at the certain time point and a switching destination access point; and
a control unit that:
monitors strength of a radio signal transmitted by a currently-connected access point at a current time point,
retrieves the switching destination information from the storage unit, and upon determining that the currently-connected access point and an access point connected immediately before the current time point respectively match the connected access point at the certain time point and the previously connected access point at the certain time in the switching destination information, identifies the switching destination access point in the switching destination information as a connection destination access point, and
execute connection processing to the connection destination access point that has been identified in response to the strength of the radio signal transmitted by the currently-connected access point falling outside a threshold value.

2. The wireless communication device according to claim 1, wherein
in a case where the switching destination information includes a plurality of candidate switching destination access points per travel route, the control unit identifies the connection destination access point based on a connection priority of an access point.

3. The wireless communication device according to claim 2, wherein
the storage unit further stores connection history of the wireless communication device to access points, and
the connection priority is calculated based on the connection history of the wireless communication device.

4. The wireless communication device according to claim 2, wherein
the storage unit further stores a distance between access points, and
the connection priority is calculated based on a distance from a currently-connected access point to a switching destination access point.

5. The wireless communication device according to claim 1, wherein
   in a case where the switching destination information includes no candidate switching destination access point corresponding to the travel route of the wireless communication device, the control unit identifies the connection destination access point by communicating with neighboring access points, and
   the control unit further stores the travel route of the wireless communication device and the connection destination access point in association with each other in the storage unit.

6. A wireless communication system comprising:
   the wireless communication device according to claim 1; and
   a server device including a storage unit, wherein
   the wireless communication device receives the switching destination information from the server device and stores the switching destination information in the storage unit of the wireless communication device.

7. A wireless communication connection method comprising:
   storing, in a storage unit, switching destination information indicating correspondence between a travel route of the wireless communication device and a candidate switching destination access point, wherein
      in the switching destination information, a connected access point at a certain time point is associated with a previously connected access point at the certain time point and a switching destination access point;
   monitoring strength of a radio signal transmitted by a currently-connected access point at a current time point;
   retrieving the switching destination information from the storage unit, and upon determining that the currently-connected access point and an access point connected immediately before the current time point respectively match the connected access point at the certain time point and the previously connected access point at the certain time point in the switching destination information, identifying the switching destination access point in the switching destination information as a connection destination access point; and
   executing connection processing to the connection destination access point that has been identified in response to the strength of the radio signal transmitted by the currently-connected access point falling outside a threshold value.

8. A non-transitory computer readable storage medium storing a program for causing a computer to execute:
   storing, in a storage unit, switching destination information indicating correspondence between a travel route of the wireless communication device and a candidate switching destination access point, wherein
      in the switching destination information, a connected access point at a certain time point is associated with a previously connected access point at the certain time point and a switching destination access point;
   monitoring strength of a radio signal transmitted by a currently-connected access point at a current time point;
   retrieving the switching destination information from the storage unit, and upon determining that the currently-connected access point and an access point connected immediately before the current time point respectively match the connected access point at the certain time point and the previously connected access point at the certain time point in the switching destination information, identifying the switching destination access point in the switching destination information as a connection destination access point; and
   executing connection processing to the connection destination access point that has been identified in response to the strength of the radio signal transmitted by the currently-connected access point falling outside a threshold value.

* * * * *